US009800058B2

(12) United States Patent
Yoshida et al.

(10) Patent No.: US 9,800,058 B2
(45) Date of Patent: Oct. 24, 2017

(54) WIRELESS POWER SUPPLY SYSTEM

(71) Applicant: DENSO CORPORATION, Kariya, Aichi-pref. (JP)

(72) Inventors: Ichiro Yoshida, Takahama (JP); Kiyohiko Sawada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 389 days.

(21) Appl. No.: 14/420,693

(22) PCT Filed: Jun. 26, 2013

(86) PCT No.: PCT/JP2013/003989
§ 371 (c)(1),
(2) Date: Feb. 10, 2015

(87) PCT Pub. No.: WO2014/041729
PCT Pub. Date: Mar. 20, 2014

(65) Prior Publication Data
US 2015/0236515 A1  Aug. 20, 2015

(30) Foreign Application Priority Data
Sep. 14, 2012  (JP) .................................. 2012-202714

(51) Int. Cl.
*H02J 5/00* (2016.01)
(52) U.S. Cl.
CPC ..................... *H02J 5/005* (2013.01)
(58) Field of Classification Search
USPC ....................................................... 307/104
See application file for complete search history.

(56) References Cited

U.S. PATENT DOCUMENTS

2009/0243397 A1  10/2009  Cook et al.
2009/0284082 A1  11/2009  Mohammadian
(Continued)

FOREIGN PATENT DOCUMENTS

JP  2010-017041 A       1/2010
JP  2011-120410    *   6/2011
(Continued)

OTHER PUBLICATIONS

International Search Report of the International Searching Authority dated Aug. 13, 2013 in the corresponding International application No. PCT/JP2013/003989 (and English translation).
(Continued)

*Primary Examiner* — Rexford Barnie
*Assistant Examiner* — Xuan Ly
(74) *Attorney, Agent, or Firm* — Posz Law Group, PLC

(57) ABSTRACT

A wireless power supply system includes a power supply-side apparatus having a power supply unit configured to wirelessly supply power, a power reception-side apparatus having a power reception unit configured to receive the power from the power supply unit, a power supply area memory configured to store a power supply area where the power is supplied from the power supply unit to the power reception unit, an object position detector configured to detect a position of an object, a notifying unit configured to notify notification information, and a controller configured to cause the notifying unit to notify the information about the power supplied from the power supply unit to the power reception unit based on the power supply area stored in the power supply area memory and the position of the object detected by the object position detector.

14 Claims, 9 Drawing Sheets

(56) References Cited

U.S. PATENT DOCUMENTS

2012/0007549 A1   1/2012  Murayama et al.
2014/0042823 A1*  2/2014  Nakahara ............. H01M 10/46
                                              307/104

FOREIGN PATENT DOCUMENTS

JP   2011-120410 A   6/2011
JP   2011-244624 A   12/2011

OTHER PUBLICATIONS

Written Opinion of the International Searching Authority dated Aug. 13, 2013 in the corresponding International application No. PCT/JP2013/003989 (and English translation).

* cited by examiner

WIRELESS POWER SUPPLY SYSTEM

CROSS REFERENCE TO RELATED APPLICATIONS

This application is a U.S. national stage application of International Patent Application No. PCT/JP2013/003989 filed on Jun. 26, 2013 and is based on Japanese Patent Application No. 2012-202714 filed on Sep. 14, 2012, the disclosure of which is incorporated herein by reference.

TECHNICAL FIELD

The present disclosure relates to a wireless power supply system including a power supply-side apparatus with a power supply means for wirelessly supplying power and a power reception-side apparatus with a power reception means for receiving power from the power supply means.

BACKGROUND

As wireless power supply (contactless power supply) efficiency is being promoted nowadays, a wireless power supply system for wirelessly supplying (transmitting) power from a power supply-side apparatus to a power reception-side apparatus is provided (refer to, for example, patent literature 1).

PATENT LITERATURE

Patent Literature 1: JP 2011-525098A

SUMMARY

When a wireless power supply system is installed in a limited space such as in a house and a vehicle, radiation exposure becomes a problem. That is, for example, in a house or a vehicle, since it is difficult to physically separate a space where a user acts from a space where electric power is supplied, the user acts in the space where electric power is supplied. For this reason, there is a demand for a mechanism to notify a user of information (where and how much power is supplied) about power supply.

In view of the above, it is an object of the present disclosure to provide a wireless power supply system capable of adequately notifying a user of information about power supply from a power supply-side apparatus to a power reception-side apparatus so that problems such as radiation exposure can be forestalled.

According to a first aspect of the present disclosure, a wireless power supply system includes a power supply-side apparatus having a power supply unit configured to wirelessly supply power, a power reception-side apparatus having a power reception unit configured to receive the power from the power supply unit, a power supply area memory configured to store a power supply area where the power is supplied from the power supply unit to the power reception unit, an object position detector configured to detect a position of an object, a notifying unit configured to notify notification information, and a controller. The controller causes the notifying unit to notify the information about the power supplied from the power supply unit to the power reception unit based on the power supply area stored in the power supply area memory and the position of the object detected by the object position detector. The information includes at least a location of a dangerous area where there is a possibility that the object is subjected to radiation exposure depending on an output of the power supplied from the power supply unit to the power reception unit. In such an approach, the position of the object with respect to the power supply area is detected, and the information, including at least the location of the dangerous area, about the power supplied from the power supply-side apparatus to the power reception-side apparatus is notified to a user adequately. That is, when the object is inside the power supply area, it is notified that the object is likely to be subjected to radiation exposure, and when the object is outside the power supply area, it is notified that the object is less likely to be subjected to radiation exposure. Thus, problems such as radiation exposure can be forestalled.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
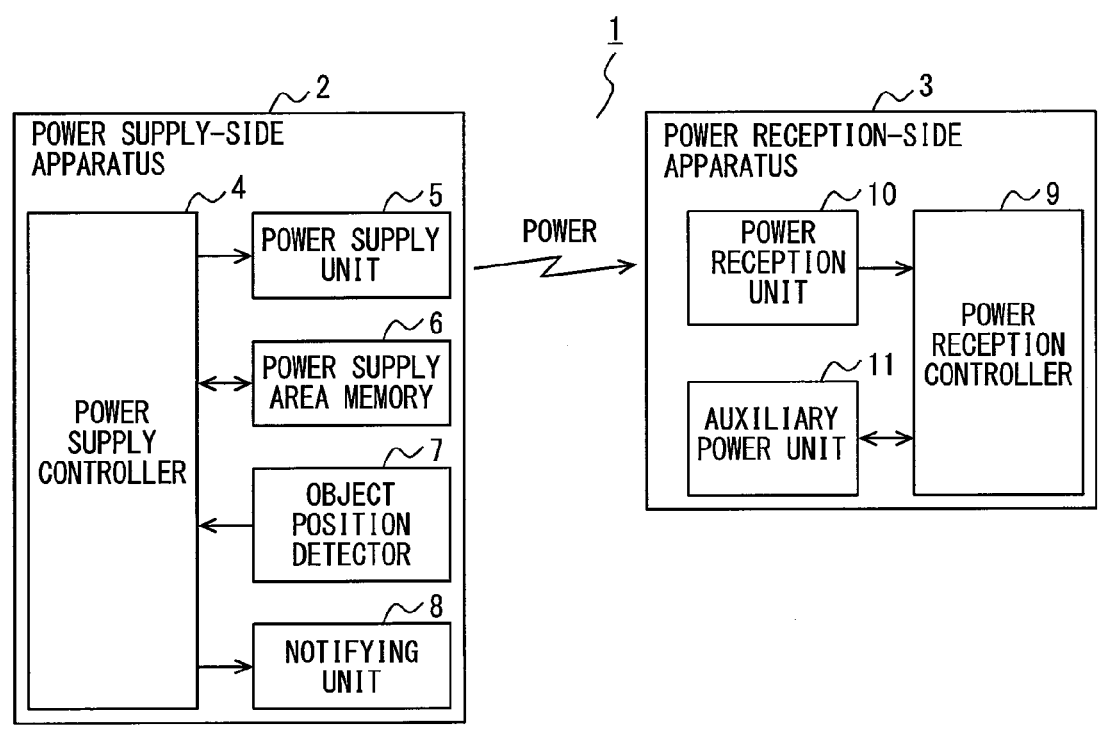
FIG. 1 is a functional block according to an embodiment of the present disclosure.
Figure 2:
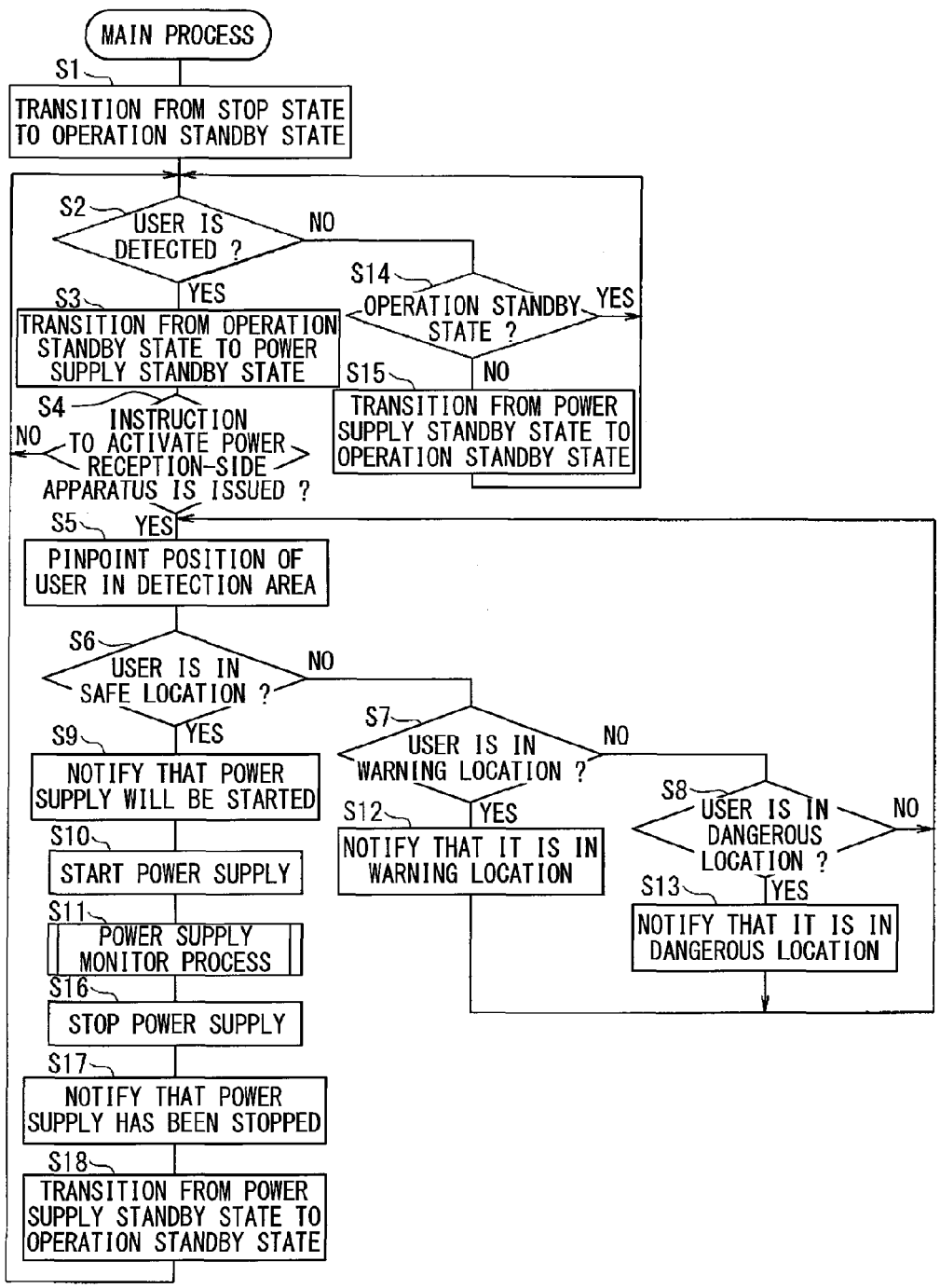
FIG. 2 is a flowchart of a main process of a power supply controller.
Figure 3:
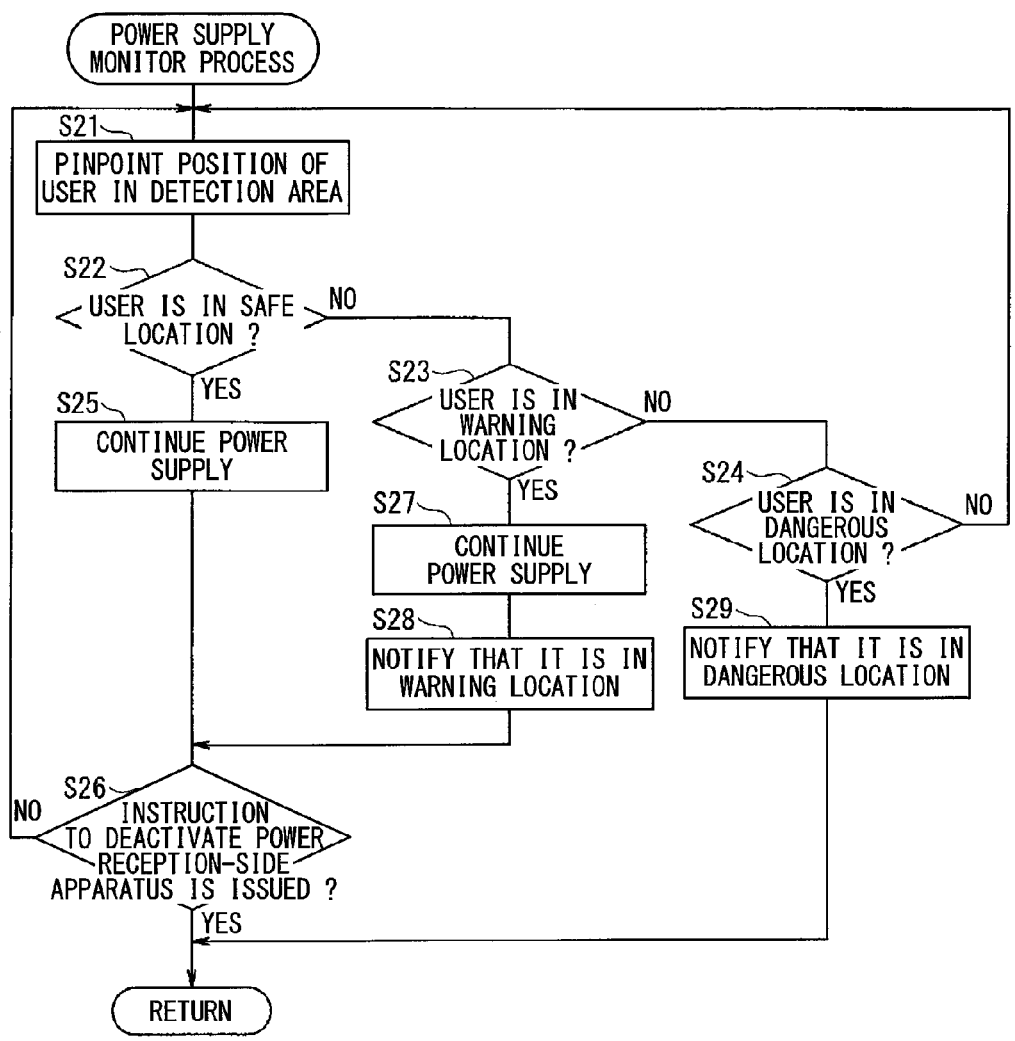
FIG. 3 is a flowchart of a power supply monitor process of the power supply controller.

Below, an embodiment of the present invention is described with reference to the drawings. A wireless power supply system 1 includes a power supply-side apparatus 2 and a power reception-side apparatus 3.

The power supply-side apparatus 2 includes a power supply controller 4 (corresponding to control means), a power supply unit 5 (corresponding to power supply means), a power supply area memory 6 (corresponding to power supply area memory means), an object position detector 7 (corresponding to an object position detecting means), and a notifying unit 8 (corresponding to notifying means). The power supply controller 4 has a typical microcomputer including a CPU, a RAM, a ROM, and an I/O bus and controls the whole operation of the power supply-side apparatus 2 such as power supply control by executing computer programs stored in the ROM, for example. The power supply unit 5 has a power supply coil or a power supply capacitor and supplies (transmits) electric power to the power reception-side apparatus 3 by magnetically resonating with a power reception coil or a power reception capacitor of a power reception unit 10 of the power reception-side apparatus 3, which is described later. In this case, the power supply controller 4 is capable of controlling an output of electric power from the power supply unit 5.

The power supply area memory 6 stores a power supply area where power is supplied from the power supply unit 5 of the power supply-side apparatus 2 to the power reception unit 10 of the power reception-side apparatus 3. For example, the object position detector 7 can be a CCD (charged coupled device) image sensor, a CMOS (complementary metal oxide semiconductor) image sensor, a current collecting sensor, or an infrared sensor and detect a location of an object (for example, human and animal). In this case, the object position detector 7 sets a detection area to an area including the above-described power supply area. That is, the power supply controller 4 can detect whether or not the object enters the power supply area and also can detect whether or not the object exits the power supply area. The notifying unit 8 can include a device, such as a liquid-crystal display and a LED, capable of notifying visual information or a device, such as a speaker, capable of notifying audible information, and notifies various types of notifying information to a user.

The power reception-side apparatus 3 includes a power reception controller 9, a power reception unit 10, and an auxiliary power unit 11. The power reception controller 9 has a typical microcomputer including a CPU, a RAM, a ROM, and an I/O bus and controls the whole operation of the power reception-side apparatus 3, such as power reception control and control of power supply from the auxiliary power unit 11, by executing computer programs stored in the ROM, for example. The power reception unit 10 has a power reception coil or a power reception capacitor, generates direct current by rectifying high-frequency current induced in the magnetic resonance, and uses the generated direct current as power.

The auxiliary power unit 11 stores power. When receiving a start instruction from the power reception controller 9, the auxiliary power unit 11 starts supplying the stored power, and when receiving an end instruction from the power reception controller 9, the auxiliary power unit 11 stops supplying the stored power. That is, during a period of time where power the power reception unit 10 receives from the power supply unit 5 of the power supply-side apparatus 2 is not less than a predetermined amount, the reception-side apparatus 3 operates on the received power, and during a period of time where power the power reception unit 10 receives from the power supply unit 5 is less than the predetermined amount, the power reception controller 9 sends the start instruction to the auxiliary power unit 11 so that the reception-side apparatus 3 can operate on power supplied from the auxiliary power unit 11. According to the present embodiment, the auxiliary power unit 11 is incorporated (integrated) in the reception-side apparatus 3. Alternatively, the auxiliary power unit 11 can be an external (separate) unit added to the reception-side apparatus 3. According to the present embodiment, a magnetic resonance method for supplying power using magnetic resonance is employed. Alternatively, a radio method for supplying power in the form of electromagnetic waves, an electromagnetic induction method for supplying power through a medium of induced magnetic flux, or an electric field coupling method for supplying power using an electric field can be employed.

Next, effects of the above structure are described with further reference to FIGS. 2 to 9. The following description is based on a case where an object to be detected by the object position detector 7 is a user (human being).

In the power supply-side apparatus 2, the power supply controller 4 performs a main process when the power supply-side apparatus 2 is powered ON. When the power supply-side apparatus 2 is powered ON, and the power supply controller 4 starts the main process, the power supply controller 4 transitions from a stop state to an operation standby state (low power consumption operation state) (step S1) and determines whether or not the user is detected by the object position detector 7. If the power supply controller 4 determines that the user is detected as a result of the fact that the user enters the detection area of the object position detector 7 and stays in the detection area of the object position detector 7 (step S2: YES), the power supply controller 4 transitions from the operation standby state to a power supply standby state (step S3). The power supply standby state is a state where a preparation necessary to quickly start power supply from the power supply unit 5 to the power reception unit 10 is done.

Next, the power supply controller 4 determines whether an instruction to activate the reception-side apparatus 3 is issued (step S4). When determining that the instruction to activate the reception-side apparatus 3 is issued (step S4: YES), for example, due to the fact that a user operates an activation switch (not shown, a switch operated by a user to start watching television if the reception-side apparatus 3 is a television set) of the reception-side apparatus 3 or due to the fact that a preset activation time comes, the power supply controller 4 pinpoints a position of the user in the detection area and determines where the user is in the detection area (step S5).

If the power supply controller 4 determines that the user becomes undetected (step S2: NO) due to the fact that the user exits the detection area of the object position detector 7 after determining that the user is detected once (step S2: YES) and before determining that the instruction to activate the reception-side apparatus 3 is issued, the power supply controller 4 determines whether it is in the operation standby state at this time (step S14). If the power supply controller 4 determines that it is not in the operation standby state at this time (step S15: NO), the power supply controller 4 determines whether the user is detected by the object position detector 7 again (step S2).

Figure 4:
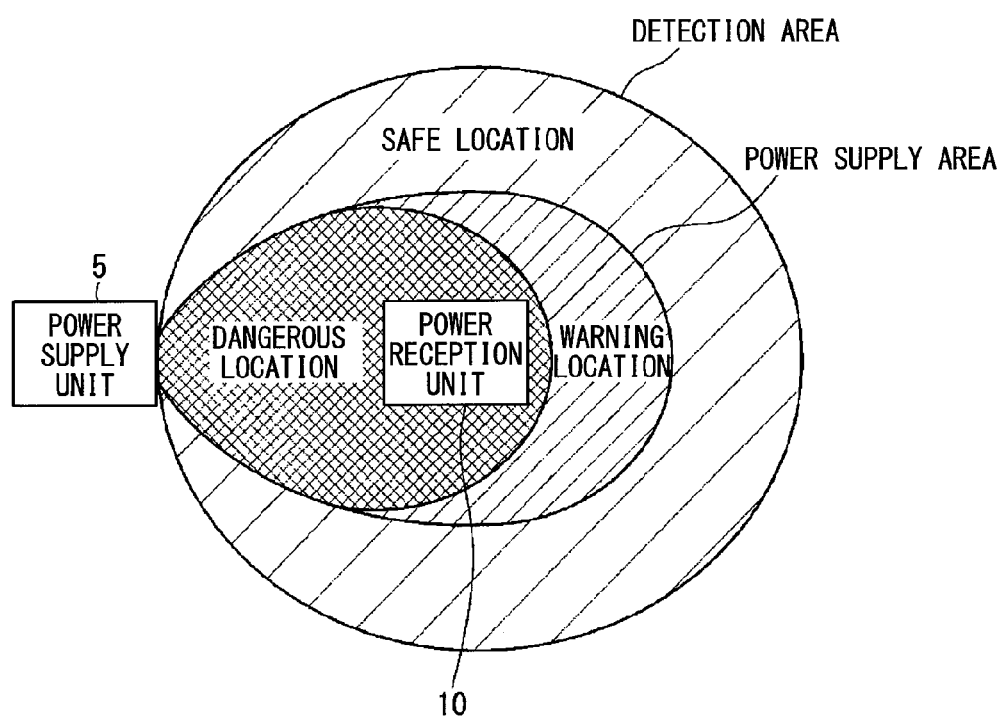
FIG. 4 is a diagram illustrating a safe location, a warning location, and a danger location.

As shown in FIG. 4, the power supply controller 4 sets a location inside the detection area and outside the power supply area to a safe location, sets a location of the far side of the power supply area from the power supply unit 5 to a warning location, and sets a location of the near side of the power supply area from the power supply unit 5 to a dangerous location. The safe location is where an output of power transferred from the power source unit 5 to the power reception unit 10 is very small, i.e., where there is a very small possibility of radiation exposure. The warning location is where an output of power transferred from the power source unit 5 to the power reception unit 10 is moderate, i.e., where there is a moderate possibility of radiation exposure. The dangerous location is where an output of power transferred from the power source unit 5 to the power reception unit 10 is very large, i.e., where there is a very large possibility of radiation exposure.

When determining that the user is in the safe location (step S6: YES), the power supply controller 4 causes the notifying unit 8 to provide notification information, such as audio guidance "power supply will be started", indicating that power supply is started (step S9), causes the power supply unit 5 to start supplying power to the power reception unit 10 (step S10), and jumps to a power supply monitor process. When determining that the user is in the warning location (step S7: YES), the power supply controller 4 causes the notifying unit 8 to provide notification information, such as audio guidance "you are in a warning location", indicating that the user is in the warning location without causing the power supply unit 5 to start supplying power to the power reception unit 10 (step S12). When determining that the user is in the dangerous location (step S8: YES), the power supply controller 4 causes the notifying unit 8 to provide notification information, such as audio guidance "you are in a dangerous location", indicating that the user is in the dangerous location without causing the power supply unit 5 to start supplying power to the power reception unit 10 (step S13). The power supply controller 4 can notify the position of the user in different manners. For example, notification indicating that the user is in the safe location may be made by lighting a LED in green, notification indicating that the user is in the waning location may be made by lighting a LED in yellow, and notification indicating that the user is in the dangerous location may be made by lighting a LED in red. Since the user receives such notification information, the user can know own position for power supply. Thus, the user can know how much possibility is there that the user is subjected to radiation exposure.

When jumping to the power supply monitor process, the power supply controller 4 pinpoints the position of the user in the detection area again and determines where the user is in the detection area again (step S21). When determining that the user is in the safe location (step S22: YES), the power supply controller 4 causes the power supply unit 5 to continue to supply power to the power reception unit 10 (step S25) and determines whether an instruction to deactivate the reception-side apparatus 3 is issued (step S26). When determining that the instruction to deactivate the reception-side apparatus 3 is not issued (step S26: NO), the power supply controller 4 continues to determine where the user is in the detection area (step S21). In contrast, when determining that the instruction to deactivate the reception-side apparatus 3 is issued (step S26: YES), for example, due to the fact that the user operates a deactivation switch (not shown, a switch operated by the user to finish watching television if the reception-side apparatus 3 is a television set) of the reception-side apparatus 3 or due to the fact that a preset deactivation time comes, the power supply controller 4 ends the power supply monitor process and jumps (returns) to the main process.

When determining that the user is in the warning location (step S23: YES), the power supply controller 4 causes the notifying unit 8 to provide the notification information indicating that the user is in the warning location (step S28) while causing the power supply unit 5 to continue to supply power to the power reception unit 10 (step S27) and then determines whether the instruction to deactivate the reception-side apparatus 3 is issued (step S26). When determining that the user is in the dangerous location (step S24: YES), the power supply controller 4 causes the notifying unit 8 to provide the notification information indicating that the user is in the dangerous location (step S29) and returns to the main process by ending the power supply monitor process without determining whether the instruction to deactivate the reception-side apparatus 3 is issued.

When returning to the main process by ending the power supply monitor process, the power supply controller 4 causes the power supply unit 5 to stop supplying power to the power reception unit 10 (step S16), causes the notifying unit 8 to provide notification information, such as audio guidance "power supply has been ended", indicating that power supply has been ended (step S17), transitions from the power supply standby state to the operation standby state (step S18), and then returns to step S2 to determine again whether the user is detected by the object position detector 7.

According to the above described processes, power supply from the power supply-side apparatus 2 to the reception-side apparatus 3 is started on condition that a user is in the safe location. When the user moves to the warning location from the safe location after power supply is started, the user is notified that the user is in the warning location. Further, when the user moves to the dangerous location from the warning location, the user is notified that the user is in the dangerous location, and power supply is forcibly ended. Alternatively, when the user moves from the safe location to the warning location, power supply can be forcibly ended without notifying the user that the user is in the warning location. Further, it is not always necessary that power supply is forcibly ended when the user moves from the warning location to the dangerous location. Furthermore, the classification can be made into two locations including the safe location and the dangerous location instead of being made into three locations including the safe location, the warning location, and the dangerous location.

When the user moves (returns) to the safe location from the dangerous location after power supply is forcibly ended, power supply can be restarted. Further, when the user moves to the dangerous location from the safe location, an output of power can be forcibly reduced instead of power supply being forcibly ended, and when the user moves (returns) to the safe location from the dangerous location, the output of power can be restored. Further, in the power reception-side apparatus 3, when power supply is forcibly ended, the power reception controller 9 can output a start instruction to the auxiliary power unit 11 to start supplying power stored in the auxiliary power unit 11, and when power supply is restarted, the power reception controller 9 can output a stop instruction to the auxiliary power unit 11 to stop supplying power stored in the auxiliary power unit 11.

Figure 5A:
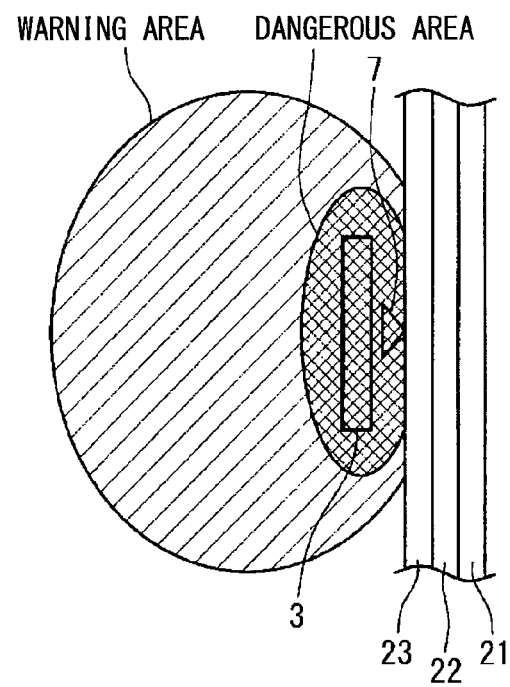
FIG. 5A is a plan view from a ceiling, illustrating a manner in which a wireless power supply system is installed in a house.
Figure 5B:
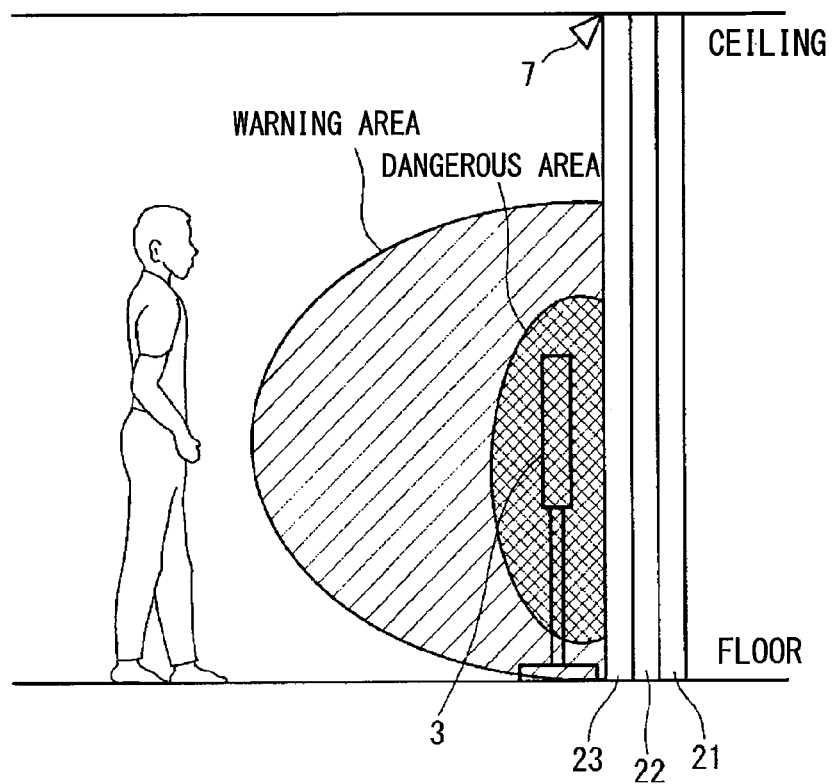
FIG. 5B is a side view illustrating the manner in which the wireless power supply system is installed in the house.

Next, a concrete use of the wireless power supply system 1 is described. For example, the wireless power supply system 1 can be installed in a house in a manner as shown in FIGS. 5A and 5B. Specifically, a power supply board (power supply layer) 22 and a light emitting board (light emitting layer) 23 are placed along a surface of an inner wall 21 of a room. The functional blocks of the power supply-side apparatus 2 shown in FIG. 1 are mounted in a distributed manner between the power supply board 22 and the light emitting board 23. The power supply controller 4, the power supply unit 5, and the power supply area memory 6 are mounted on the power supply board 22, and the notifying unit 8 is mounted on the light emitting board 23. Further, the object position detector 7 is mounted on a ceiling so that a region (user's active area) in front of the light emitting board 23 can be the detection area. In this case, the power reception-side apparatus 3 can be a household electrical appliance, such as a television set and an audio player, and activated by receiving power from the power supply board 22. When the power supply board 22 supplies power to the power reception-side apparatus 3, a dangerous area containing the dangerous location is formed around the power reception-side apparatus 3, and a warning area containing the warning location is formed around the dangerous area.

Figure 6:
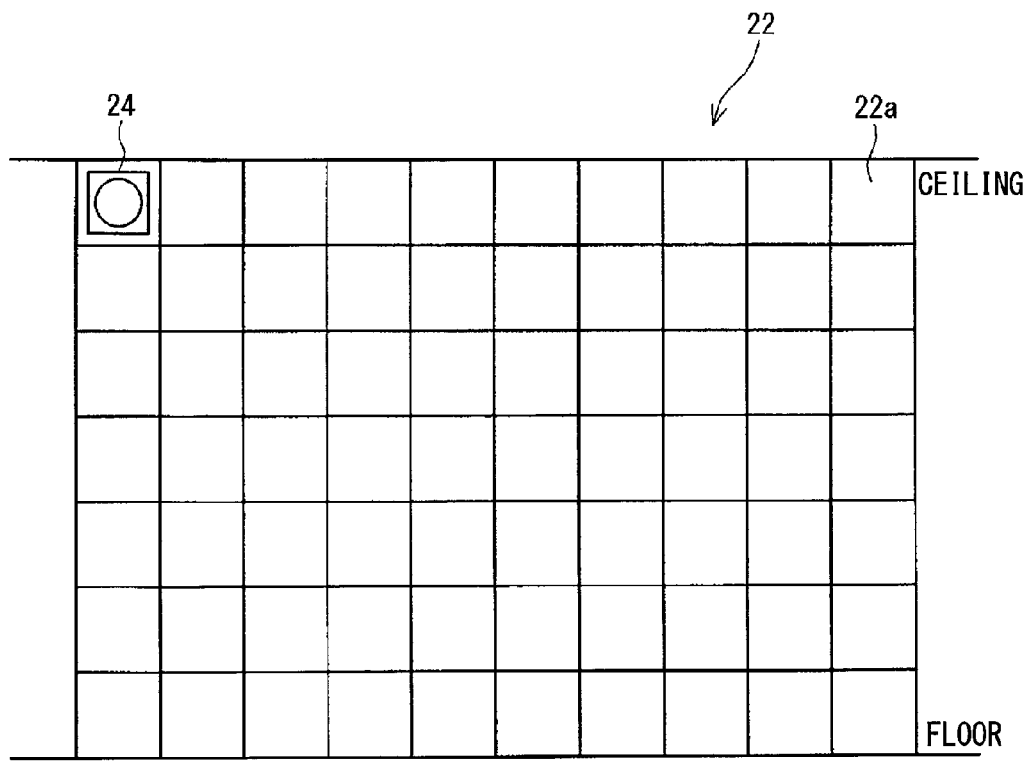
FIG. 6 is a diagram illustrating a structure of a power supply board.

As shown in FIG. 6, the power supply board 22 has multiple installation spaces 22a (in FIG. 6, a product of seven blocks in the vertical direction and ten blocks in the horizontal direction) sectioned in the horizontal and vertical directions. A unit device 24 having a power supply coil or a power supply capacitor of the power supply unit 5 can be installed in any of the installation spaces 22a. That is, the user can install the unit device 24 in any of the installation spaces 22a according to where the power reception-side apparatus 3 is installed in the room. Of course, multiple unit devices 24 can be installed.

Figure 7:
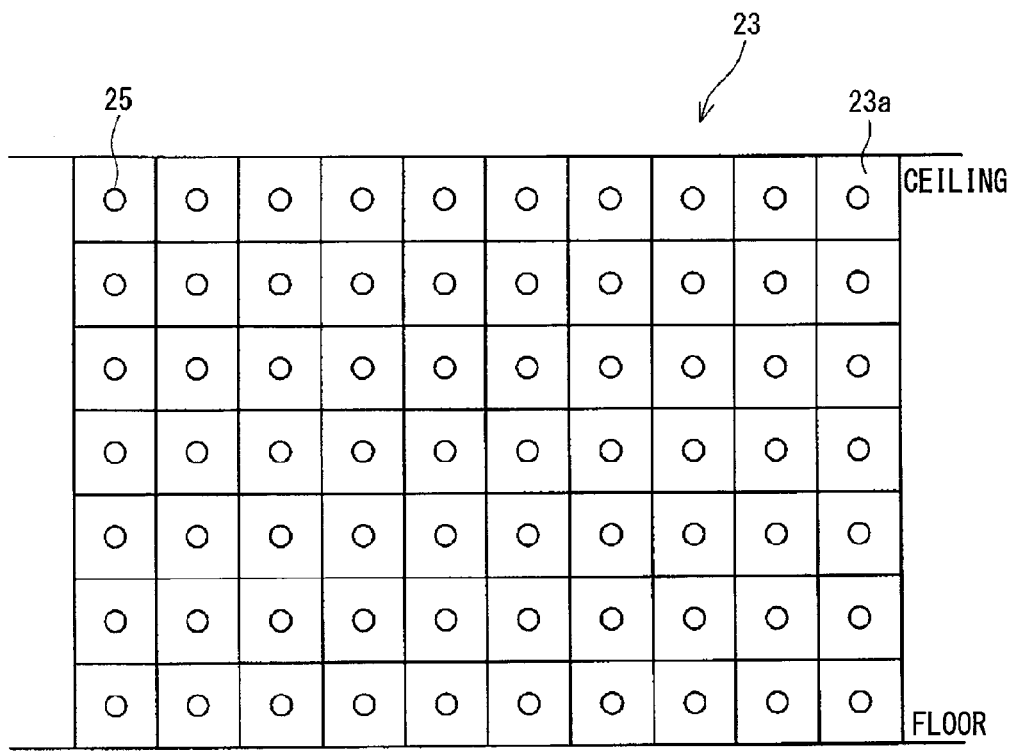
FIG. 7 is a diagram illustrating a structure of a light emitting board.
Figure 8:
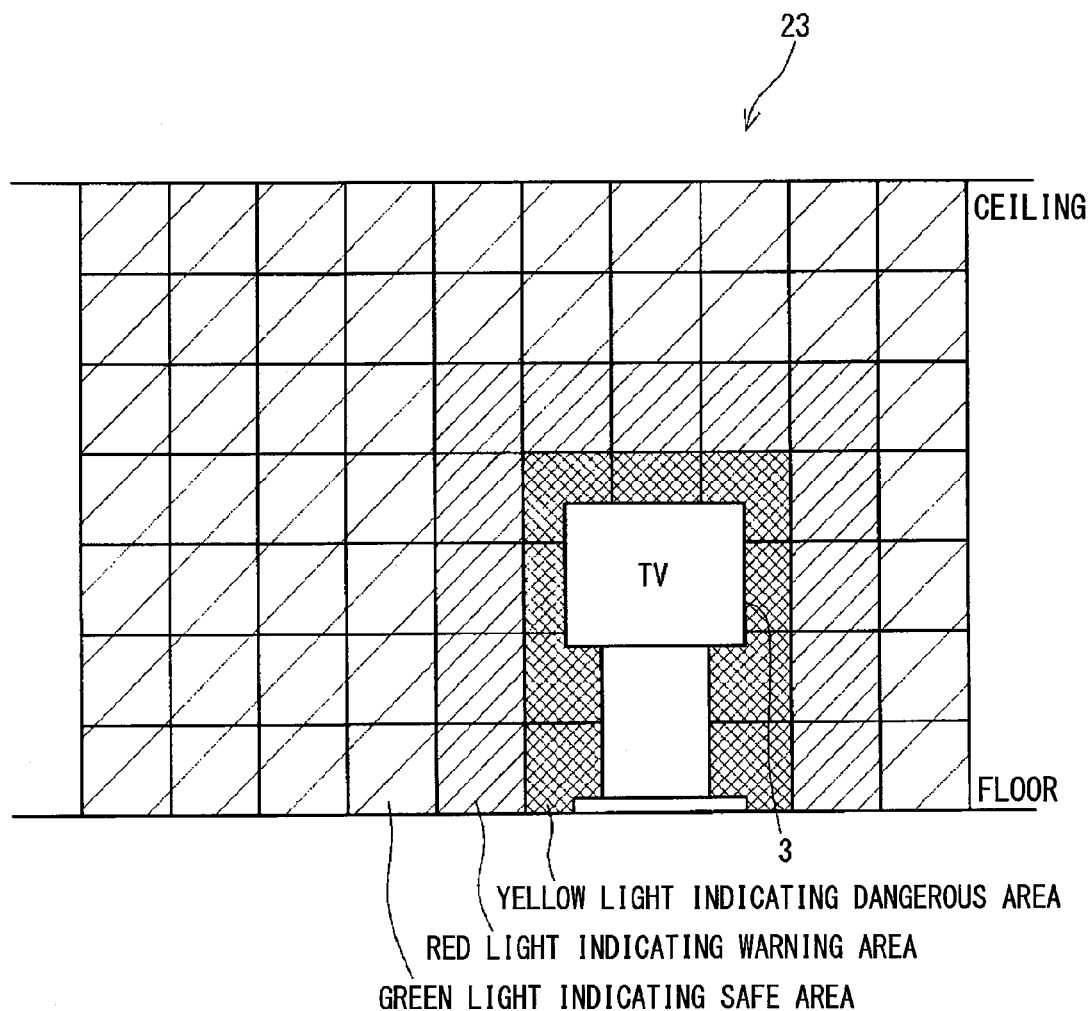
FIG. 8 is a diagram illustrating a manner in which the light emitting board provides a notification.

As shown in FIG. 7, the light emitting board 23 has multiple installation spaces 23a sectioned in the horizontal and vertical directions to correspond to the installation spaces 22a of the power supply board 22. A LED 25 of the notifying unit 8 is installed in each installation space 23a. In this case, as shown in FIG. 8, the unit device 24 can be installed corresponding to the installation space 23a of the light emitting board 23 where a television set as an example of the power reception-side apparatus 3 is located. When the unit device 24 supplies power to the power reception-side apparatus 3, the LED 25 lights in color which changes according to an output of the power. That is, behind the power reception-side apparatus 3 where the output of the power is a maximum, the LED 25 lights in, for example, red to indicate the dangerous area. Further, around the dangerous area (on far side from the power reception-side apparatus 3), the LED 25 lights in, for example, yellow to indicate the warning area. Furthermore, around the warning area (on far side from the power reception-side apparatus 3), the LED 25 lights in, for example, green to indicate the safe area.

Figure 9:
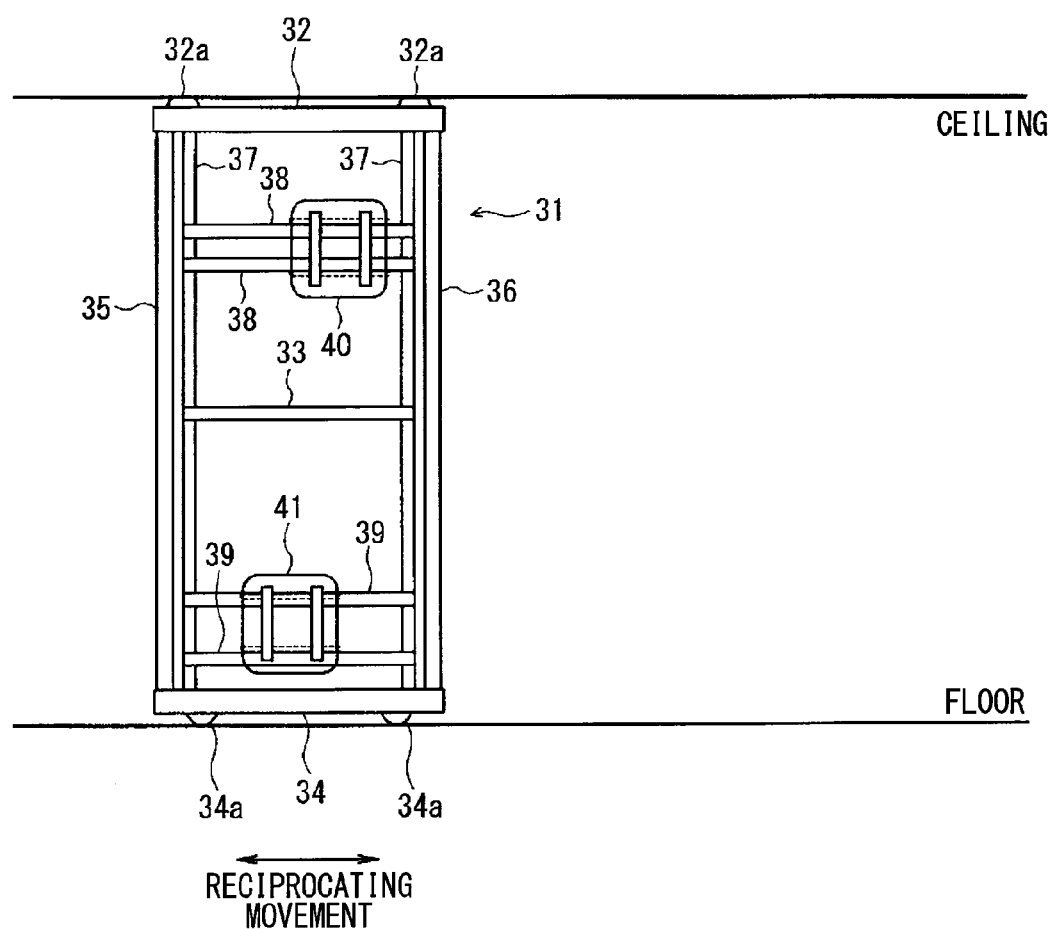
FIG. 9 is a diagram illustrating a movable unit.

As shown in FIG. 9, a movable unit 31 capable of moving in a reciprocating manner in the horizontal direction along the wall surface can be used to install the unit device 24. The movable unit 31 includes a ceiling-side frame 32 with a guide 32a, a middle frame 33, a floor-side frame 34 with wheels 34a, vertical frames 35 and 36, a pair of vertical guide rails 37, a pair of horizontal guide rails 38 and 39, and device supporting members 40 and 41. Under a condition where the unit device 24 is attached to the device supporting member 40 or 41, the device supporting member 40 or 41 is moved in the horizontal direction along the horizontal guide rail 38 or 39, and the horizontal guide rail 38 or 39 is moved in the vertical direction along the vertical guide rails 37, so that the unit device 24 can be positioned.

As described above, according to the present embodiment, the position of the user with respect to the power supply area where power is supplied from the power supply unit 5 of the power supply-side apparatus 2 to the power reception unit 10 of the power reception-side apparatus 3 is detected, and information (regarding which of the safe location, the warning location, and the dangerous location) about power supply is notified according to the detected position. Thus, when the user is inside the power supply area, the user can be notified that the user is likely to be subjected to radiation exposure, and when the user is outside the power supply area, the user can be notified that the user is less likely to be subjected to radiation exposure. Since the information about power supply is adequately provided to the user, problems such as radiation exposure can be forestalled.

Further, when the user moves, for example, from the safe location to the dangerous location, power supply can be stopped. Thus, negative effects caused by continuing power supply can be forestalled. Then, when the user moves, for example, from the dangerous location to the safe location after power supply can be stopped, power supply is restarted. Thus, it can be immediately returned to the state before power supply is stopped.

Further, when the user moves, for example, from the safe location to the dangerous location, the output of power can be reduced. Then, when the user moves, for example, from the dangerous location to the safe location after the output of power is reduced, the output of power can be restored. Thus, the same effect and advantage can be obtained.

Further, when power supply is stopped or the output of power is reduced, the auxiliary power unit 11 can start being used, and when power supply is restarted or the output of power is restored, the auxiliary power unit 11 can stop being used. In such an approach, the power reception-side apparatus 3 can continue to operate while problems such as radiation exposure are forestalled.

(Modifications)

While the present disclosure has been described with reference to the embodiments, it is to be understood that the disclosure is not limited to the embodiments. The present disclosure is intended to cover various modifications and equivalent arrangements inside the spirit and scope of the present disclosure.

It can be installed in a vehicle instead of a house. For example, in a charge holder capable of being installed in a vehicle and capable of wirelessly charging a mobile device such as a handheld terminal and a cellular phone, information about power supply from the charge holder to the mobile device can be notified.

A target to be detected can be animals (pets) besides a user.

The information about power supply can be notified tactually using, for example, vibration instead of visually or acoustically.

The power reception-side apparatus 3 can notify a user that whether it operates on power received from the power supply-side apparatus 2 or it operates on power received from the auxiliary power unit 11.

The present disclosure can be applied to a system where power supply is performed from a house to an electric vehicle by installing the power supply-side apparatus 2 in the house while installing the power reception-side apparatus 3 in the electric vehicle.

The invention claimed is:

1. A wireless power supply system comprising:
   a power supply-side apparatus having a power supply unit configured to wirelessly supply power;
   a power reception-side apparatus having a power reception unit configured to receive the power from the power supply unit;
   a power supply area memory configured to store a power supply area where the power is supplied from the power supply unit to the power reception unit;
   an object position detector configured to detect a position of an object;
   a notifying unit configured to notify notification information, and
   a controller configured to cause the notifying unit to notify the information about the power supplied from the power supply unit to the power reception unit based on the power supply area stored in the power supply area memory and the position of the object detected by the object position detector, the information including at least a location of a dangerous area where there is a possibility that the object is subjected to radiation exposure depending on an output of the power supplied from the power supply unit to the power reception unit, wherein
   the controller is configured, when determining that the object is in the dangerous area, to cause the notifying unit to notify first information and to cause the power supply unit to stop supplying the power to the power reception, and the controller is configured, when determining that the object is in a warning area, to cause the notifying unit to notify second information, which is different from the first information, and to cause the power supply unit to continue supplying the power to the power reception.

2. The wireless power supply system according to claim 1, wherein
the controller causes the power supply unit to stop supplying the power to the power reception unit when determining that the power supply needs to be stopped based on the power supply area stored in the power supply area memory and the position of the object detected by the object position detector.

3. The wireless power supply system according to claim 2, wherein
the controller causes the power supply unit to restart supplying the power to the power reception unit when determining that the power supply needs to be restarted based on the power supply area stored in the power supply area memory and the position of the object detected by the object position detector after causing the power supply unit to stop supplying the power to the power reception unit.

4. The wireless power supply system according to claim 1, wherein
the controller reduces the output of the power supplied from the power supply unit to the power reception unit when determining that the output of the power needs to be reduced based on the power supply area stored in the power supply area and the position of the object detected by the object position detector.

5. The wireless power supply system according to claim 4, wherein
the controller restores the output of the power supplied from the power supply unit to the power reception unit when determining that the output of the power needs to be restored based on the power supply area stored in the power supply area memory and the position of the object detected by the object position detector after reducing the output of the power supplied from the power supply unit to the power reception unit.

6. The wireless power supply system according to claim 1, wherein
the power reception-side apparatus includes a power reception controller configured to control a use of an auxiliary power unit, and
the power reception controller starts the use of the auxiliary power unit when determining that the use of the auxiliary power unit needs to be started based on the power supply area stored in the power supply area memory and the position of the object detected by the object position detector.

7. The wireless power supply system according to claim 6, wherein
the power reception controller stops the use of the auxiliary power unit when determining that the use of the auxiliary power unit needs to be stopped based on the power supply area stored in the power supply area memory and the position of the object detected by the object position detector after starting the use of the auxiliary power unit.

8. The wireless power supply system according to claim 1, wherein
the controller is configured
to set an area of a near side of the power supply area from the power supply unit to the dangerous area and to set an area of a far side of the power supply area from the power supply unit to the warning area.

9. The wireless power supply system according to claim 8, wherein the controller is configured to form the warning area around the dangerous area, and
the warning area is where there is less possibility that the object is subjected to radiation exposure than the dangerous area.

10. The wireless power supply system according to claim 9, wherein
the warning area is where the output of power transferred from the power source unit to the power reception unit is moderate and where there is a moderate possibility of radiation exposure.

11. The wireless power supply system according to claim 10, wherein
the controller is configured to form the dangerous area around the power reception-side apparatus, and
the dangerous location is where the output of power transferred is very large and where there is a very large possibility of radiation exposure.

12. The wireless power supply system according to claim 1, wherein
the dangerous information indicates that the object is in the dangerous location, and
the warning information indicates that the object is in the warning location.

13. A wireless power supply system comprising:
a power supply-side apparatus having a power supply unit configured to wirelessly supply power;
a power reception-side apparatus having a power reception unit configured to receive the power from the power supply unit;
a power supply area memory configured to store a power supply area where the power is supplied from the power supply unit to the power reception unit;
an object position detector configured to detect a position of an object;
a notifying unit configured to notify notification information, and
a controller configured to cause the notifying unit to notify the information about the power supplied from the power supply unit to the power reception unit based on the power supply area stored in the power supply area memory and the position of the object detected by the object position detector, the information including at least a location of a dangerous area where there is a possibility that the object is subjected to radiation exposure depending on an output of the power supplied from the power supply unit to the power reception unit, wherein
the power reception-side apparatus includes a power reception controller configured to control a use of an auxiliary power unit, and
the power reception controller starts the use of the auxiliary power unit when determining that the use of the auxiliary power unit needs to be started based on the power supply area stored in the power supply area memory and the position of the object detected by the object position detector.

14. The wireless power supply system according to claim 13, wherein
the power reception controller stops the use of the auxiliary power unit when determining that the use of the auxiliary power unit needs to be stopped based on the power supply area stored in the power supply area memory and the position of the object detected by the object position detector after starting the use of the auxiliary power unit.

* * * * *